Patented June 8, 1954

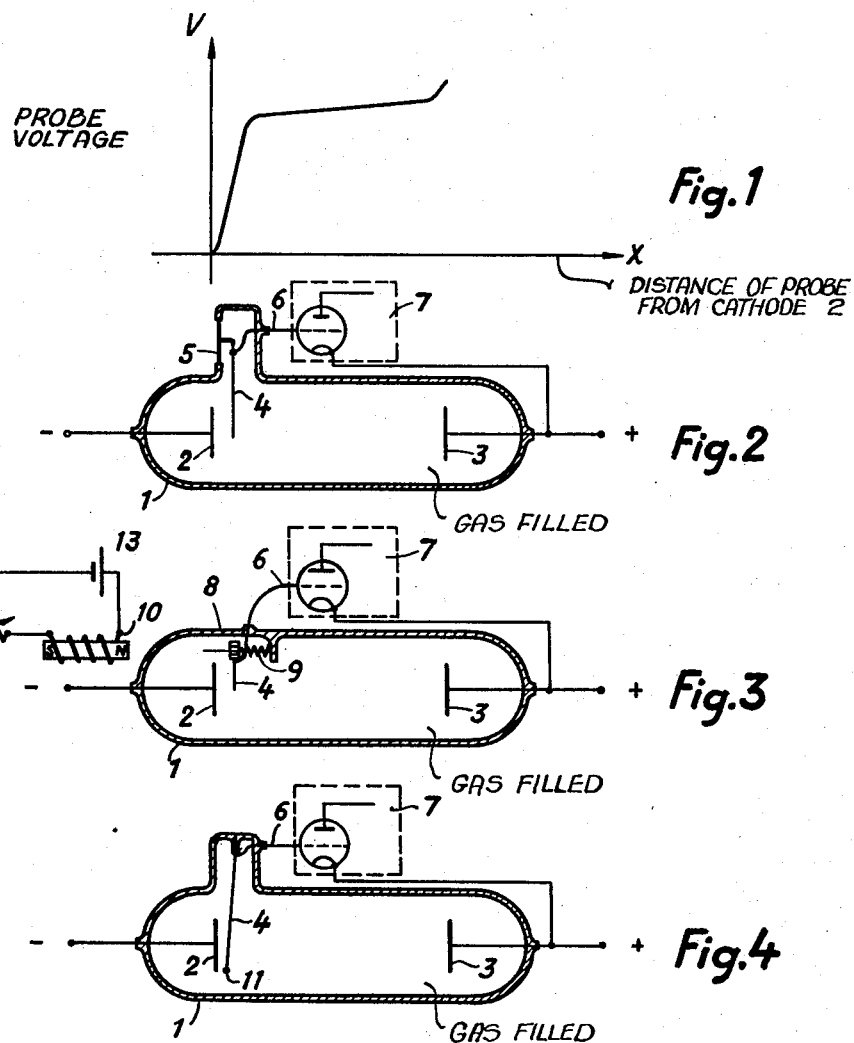

2,680,807

UNITED STATES PATENT OFFICE 2,680,807

GLOW DISCHARGE TUBE WITH A MOVABLE PROBE

Erik Waldemar Hullegård, Stockholm, Sweden, assignor to Telefonaktiebolaget L M Ericsson, Stockholm, Sweden, a company of Sweden Application January 3, 1950, Serial No. 136,518

Claims priority, application Sweden January 5, 1949

1 Claim. (Cl. 250—27)

This invention relates to an arrangement with which a mechanical process of some kind may be transformed to an electrical system so that the electrical equivalence to the characteristic details of the mechanical process is obtained.

The characteristic voltage distribution between the cathode and the anode of a glow-discharge tube, i. e. $V=f(x)$, where V represents the voltage in a point on the discharge path at a distance of $x$ from the cathode in relation to said cathode, is the basis of the invention. As is well known, the greatest voltage rise is to be found in the immediate neighbourhood of the cathode; then the voltage is almost constant, to increase a little again near by the anode. If a thin metal probe is inserted in the discharge path, said path will receive a potential, which is dependent on the position. By making the probe movable with the length of the discharge path it is possible to obtain an electrical reproduction of a mechanical force, which is acting on the probe. The change in the potential of the probe at a certain moving is dependent on where in the discharge path the probe is placed. In order to obtain this change as great as possible, it is obvious that the probe shall have its average position in the point where $$\frac{\delta V}{\delta x}$$

i. e. the derivate of V with respect to $x$, has its maximum value. As is apparent from the preceding, this is the case near the cathode.

The method to make an electrode mechanically moving is well known earlier, for example by discharge tubes with several electrodes, where a grid by being moved gives rise to changes on the anode side, these changes being dependent on the moving. In this case however, the working point of the tube will be altered, and with that perhaps there will also arise undesirable changes in the parameters of the tube. This is avoided in the present invention by the probe having no considerable influence on the discharge conditions but only transferring a measuring value of a potential of interest to an electrical system of some kind.

Some possible embodiments will now be described with reference to the accompanying drawing, in which Fig. 1 shows the curve $V=f(x)$, Fig. 2 shows an arrangement with the probe fastened to a movable part of the tube wall, Fig. 3 shows an arrangement where mechanical impulses are transferred to the probe, and Fig. 4 at last shows the probe movably hung up.

If the probe is fastened to a diaphragm, a pair of bellows or the like, and this part in its turn is a part of the tube wall, a microphone or a pickup is achieved. This arrangement is showed schematically in Fig. 2. Here 1 represents the glass wall, 2 the cathode, 3 the anode, 4 the probe which is movable with the length of the tube, 5 the movable part of the tube wall, and 6 at last a conductor which transfers the potential of the probe to an electrical system 7 of some kind. This arrangement may also serve as a temperature control, a temperature sensitive organ, e. g. possibly a bar of metal, working upon the diaphragm 5.

To avoid the difficulties that are inherent to the embodiment of the movable part of the tube wall, it is possible to insert a device between the probe and a mechanical system outside the tube, the main part of said device being a magnet. Then the probe must be fitted with a piece of malleable iron. Fig. 3 shows an example of an embodiment of said device. The same symbols as in Fig. 2 are here valid, and the following details are added: a piece of malleable iron 8, an elastic device 9, a magnet 10, a variable resistor 12 and a battery 13. The forces which are acting on the mechanical system outside the probe—not shown in the drawing—cause direct or indirect variations in the resistor 12 of the magnetic branch, whereby the magnet 10 is strengthened or weakened and the probe 4 is made to reproduce the mechanical process.

If the probe is arranged unfixedly hanging a slope indicator is obtained and by loading the probe with a weight an instrument for measuring accelerations is obtained. These two types are illustrated in Fig. 4. With the exception of the details which are the same as the preceding, the weight 11 is here added. Angle accelerations may be measured with an arrangement where the probe is unfixedly hanging in its centre of gravity.

I claim:

An electron discharge device for transforming electrical energy of one kind into electrical energy of another kind including a gas filled glow discharge tube comprising a gas filled envelope, a cathode and an anode supported within said envelope in spaced parallel relationship between which a discharge is produced at a relatively low voltage, a probe movably arranged within the envelope in close proximity to the cathode and remote from the anode so as to be responsive to the potential gradient below the knee of the curve representing the latter, and an output circuit including a vacuum tube having an anode forming one side of the circuit, a grid connected to the probe, and a cathode connected to the anode of the glow discharge tube and forming the other side of the output circuit.

References Cited in the file of this patent

UNITED STATES PATENTS

| Number | Name | Date |
|---|---|---|
| 1,318,196 | Case | Oct. 7, 1919 |
| 1,617,065 | Lorenz | Feb. 8, 1927 |
| 2,155,419 | Gunn | Apr. 25, 1939 |
| 2,440,565 | Antalek | Apr. 27, 1948 |
| 2,565,996 | Still | Aug. 28, 1951 |